(12) United States Patent
Lee et al.

(10) Patent No.: US 7,744,778 B2
(45) Date of Patent: Jun. 29, 2010

(54) POLYMERIC SURFACTANT FOR HIGH DIELECTRIC POLYMER COMPOSITES, METHOD OF PREPARING THE SAME AND HIGH DIELECTRIC POLYMER COMPOSITE COMPRISING THE SAME

(75) Inventors: Eun Sung Lee, Seoul (KR); Sang Mock Lee, Yongin-si (KR); Young Hun Byun, Yongin-si (KR); Jin Young Bae, Seoul (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 11/961,011

(22) Filed: Dec. 20, 2007

(65) Prior Publication Data
US 2008/0186653 A1    Aug. 7, 2008

(30) Foreign Application Priority Data
Feb. 6, 2007    (KR) .................. 10-2007-0012276
Sep. 12, 2007    (KR) .................. 10-2007-0092761

(51) Int. Cl.
*H01B 1/24*    (2006.01)
(52) U.S. Cl. .............. 252/511; 252/500; 252/519.33; 252/519.34; 252/502; 525/326.1; 525/328.8; 525/328.9; 525/330.1; 525/330.5; 525/244; 526/312; 361/311
(58) Field of Classification Search .......... 525/326.1, 525/328.8, 328.9, 330.1, 330.5, 244; 252/500, 252/519.33, 519.34, 502, 511; 526/312; 361/311
See application file for complete search history.

(56) References Cited

U.S. PATENT DOCUMENTS

| 5,356,660 | A | 10/1994 | Michel et al. | |
| 2002/0068170 | A1* | 6/2002 | Smalley et al. | 428/403 |
| 2007/0102676 | A1* | 5/2007 | Lee et al. | 252/500 |
| 2009/0121195 | A1* | 5/2009 | Lee et al. | 252/503 |
| 2009/0230363 | A1* | 9/2009 | Lee et al. | 252/512 |

OTHER PUBLICATIONS

Hsieh et al. Anionic Polymerization: Principles and practical Applications. 1996, p. 333.*
"High-Dielectric-Constant Silver-Epoxy Composites as Embedded Dielectrics"; Authors: Lai Qi, et al.; Advanced Materials, 2005, vol. 17, pp. 1777-1781.
Office Action issued from the KPO and its English translation; Mailing date: Aug. 21, 2008.

* cited by examiner

*Primary Examiner*—Vasu Jagannathan
*Assistant Examiner*—Mark S Kaucher
(74) *Attorney, Agent, or Firm*—Cantor Colburn LLP

(57) ABSTRACT

Disclosed is a polymeric surfactant for high dielectric polymer composites, a method of preparing the same, and a high dielectric polymer composite including the same. The polymeric surfactant for high dielectric polymer composites, which includes a head portion having high affinity for a conductive material and a tail portion having high affinity for a polymer resin, forms a passivation layer surrounding the conductive material in the high dielectric polymer composite including the polymeric surfactant, thus ensuring and controlling a high dielectric constant.

4 Claims, 3 Drawing Sheets

POLYMERIC SURFACTANT FOR HIGH DIELECTRIC POLYMER COMPOSITES, METHOD OF PREPARING THE SAME AND HIGH DIELECTRIC POLYMER COMPOSITE COMPRISING THE SAME

PRIORITY STATEMENT

This non-provisional application claims priority under U.S.C. §119 to Korean Patent Application No. 10-2007-0012276, filed on Feb. 6, 2007 and No. 10-2007-0032761, filed on Sep. 12, 2007 with the Korean Intellectual Property Office (KIPO), the entire contents of which are herein incorporated by reference.

BACKGROUND

1. Field

This disclosure is directed to a polymeric surfactant for high dielectric polymer composites, a method of preparing the same, and a high dielectric polymer composite including the same, and more particularly, to a polymeric surfactant for high dielectric polymer composites, which includes a head portion, having high affinity for a conductive material, and a tail portion, having high affinity for a polymer resin, to a method of preparing the same, and to a high dielectric polymer composite including the same.

2. Description of the Related Art

According to recent industrial trends in electronic products, mobile products are considered to lead technologies and markets. Thus, thorough research and development to decrease the size and weight of mobile products and increase the functionality thereof is being conducted.

In order to realize high-density surface mounting, a substrate is required to have fine via holes and as small a wiring pitch as possible, and to be able to be subjected to a build-up process. Further, IC packages should be miniaturized, pluralities of pins should be used, and passive parts, including condensers and resistors, should be miniaturized and surface mounted. However, with the advancement of the miniaturization of passive devices, the manufacture and mounting thereof become more difficult, and thus the conventional process has many limitations.

To overcome such limitations, there have been proposed techniques for directly forming passive devices, including resistors, inductors, capacitors, etc., on or in a printed circuit board (PCB), instead or mounting them on the PCB. The techniques for embedding passive devices are characterized in that passive devices are inserted outside or inside the substrate using new materials and processes, thereby substituting for the functions of conventional chip resistors and chip capacitors. Accordingly, there is no need to mount chip parts of the passive devices on the printed wiring board, thus realizing high density and high reliability. As the passive devices are embedded in the PCB through such techniques, the surface area of the substrate is decreased, thereby making it possible to decrease the size and weight of products. Further, inductance is reduced, to thereby improve electrical performance, and furthermore, the number of solder joints is decreased, therefore increasing apparatus reliability and reducing the manufacturing cost.

Methods of forcing passive devices on a substrate include, for example, a method of applying a mixture of organic polymer and high dielectric filler, a high loading method using an inorganic filler including barium titanate, and a method of using electron cyclotron resonance chemical vapor deposition (ECR-CVD), which can be used to form a film at low temperatures.

Among the passive devices, the resistor and inductor, which may be formed through a polymer thick film (PTF) process, have some design drawbacks, but entail no great difficulty in terms of materials and manufacturing processes. However, in the case of the capacitor, it cannot be applied to fields requiring a high capacity, because a material having high capacitance and a manufacturing process which enables the application of the material to a low-temperature process (<260° C.) have not been established. Typically, embedded condensers require capacity ranging from 1 pF to 1 μF, depending on the application fields thereof. When a thin film process is used therefor, high capacity may be achieved, but high-temperature annealing should be carried out. Furthermore, the produced ceramic thin film may easily break down when applied to an organic substrate, and the application to FR-4 or flex substrates is also limited, attributable to a high manufacturing process. In contrast, the PTF process may be easily and inexpensively performed and may ensure high applicability to an organic substrate, but results in low dielectric capacity. Hence, attempts to achieve a high dielectric constant with the use of the PTF process have been continuously made.

With the intention of realizing a high dielectric constant, the relate art discloses the use of a polymer composite consisting of a polymer resin and a conductive material. However, the above patent suffers because the conductive material in the polymer composite has a volume % associated with the percolation threshold of the polymer composite. Specifically, when the volume of the conductive material exceeds the percolation threshold of the polymer composite, electrical conduction or percolation between the particles of the conductive material occurs, drastically decreasing the dielectric constant.

SUMMARY

Disclosed herein is a polymeric surfactant for high dielectric polymer composites, which ensures a high dielectric constant and realizes low heat loss even through low-temperature burning.

Disclosed herein too is a method of preparing the polymeric surfactant.

Disclosed heroin too is a high dielectric polymer composite, which is imparted with a high dielectric constant and low heat loss through low-temperature burning.

In one embodiment, a polymeric surfactant for high dielectric polymer composites may include a tail portion, which includes a backbone and one or more side chains, which are hydrophilic or hydrophobic, connected to the backbone, and a head portion, which is connected to the backbone of the tail portion and has a side chain having a functional group having high affinity for a conductive material.

In another embodiment, a method of preparing the polymeric surfactants for high dielectric polymer composites may include reacting one or more tail portions with a monomer, composed of the backbone of the tail portion and an epoxy group-containing side chain connected thereto, in the presence of a polymerization initiator, thus obtaining a copolymer, and then reacting the copolymer with a monomer for forming one or more head portions in the presence of an acid catalyst, thus forming one or more head portions.

In yet another embodiment, a high dielectric polymer composite may include the above-mentioned polymeric surfactant, a conductive material, and a polymer resin.

BRIEF DESCRIPTION OF THE DRAWINGS

Example embodiments will be more clearly understood from the following detailed description, taken in conjunction with the accompanying drawings.

FIG. 1 is a schematic view illustrating the polymeric surfactant bound to the conductive material, according to the example embodiments;

FIG. 2 is an NMR graph illustrating the polymeric surfactant prepared in Preparative Example 1, according to the example embodiments;

FIG. 3 is a graph illustrating the dielectric constant depending on the vol % of carbon black in the example and comparative example, according to the example embodiments; and FIG. 4 is a graph illustrating the dielectric loss depending on the vol % of carbon black in the example and comparative example, according to the example embodiments.

DESCRIPTION OF THE PREFERRED EMBODIMENTS

Hereinafter, a detailed description will be given of example embodiments with reference to the appended drawings.

According to the example embodiments, a polymeric surfactant for high dielectric polymer composites includes a tail portion and a head portion, the tail portion composes of a backbone and one or more side chains, which are hydrophilic or hydrophobic, connected to the above backbone, and the head portion connected to the backbone of the tail portion and containing a side chain having a functional group having high affinity for a conductive material.

The functional group of the head portion may include one or more selected from among alkylamine, cycloalkylamine (cyclohexyl, pentylamine), arylamine (aniline, substituted aniline), amide, imine, —COOH, —SH, —PO$_3$H, —PO$_4$H, —SO$_3$H, and —SO$_4$H.

The head portion containing the functional group is highly affinitive for the conductive material and thus may form a chemical bond through reaction with the conductive material. The tail portion containing one or more side chains, which are hydrophilic or hydrophobic, has high affinity for the polymer resin. Hence, the head portion of the polymeric surfactant according to the example embodiments is bound to the conductive material of the polymer-conductive material composite, and the tail portion thereof is oriented toward the polymer resin, thus making it possible to form the passivation layer that surrounds the conductive material.

Figure 1:
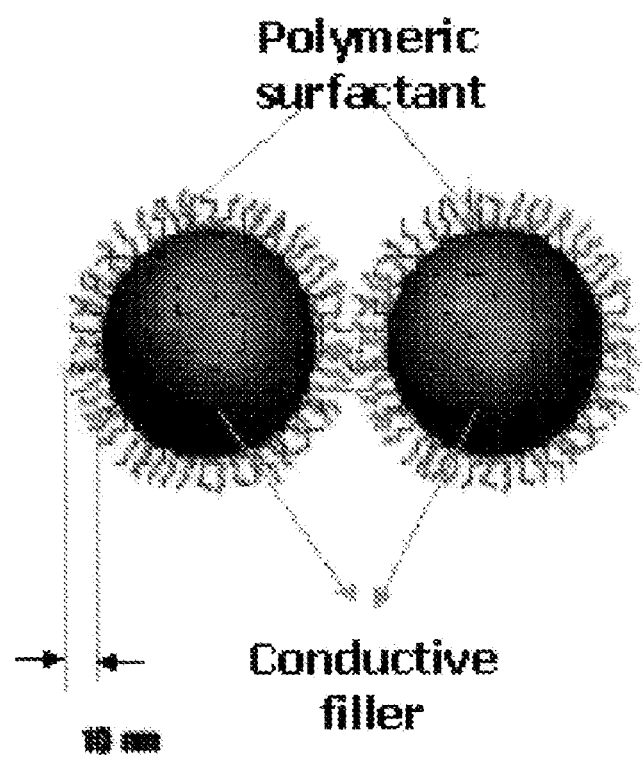
FIGS. 1~4 depict non-limiting example embodiments described herein.

FIG. 1 is a schematic view illustrating the mechanism of action of the polymeric surfactant for high dielectric polymer composites according to the example embodiments, in which the polymeric surfactant according to the example embodiments is bound to the conductive material. With reference to FIG. 1, the head portion of the polymeric surfactant according to the example, embodiments is bound to the conductive material through a chemical reaction therebetween. Through the chemical reaction, for example, the acid-base reaction between —NH$_2$, which is the functional group of the head portion of the polymeric surfactant, and —COOH of the conductive material, for example, carbon black, a salt (—NH$_3$$^+$$^-$OOC—) may be formed, or alternatively, amide may be formed through dehydrocondensation therebetween at high temperatures. As such, the head portions of the polymeric surfactants are arranged around carbon black, and the tail portions, having affinity for the polymer resin, are radially developed from the head portions, consequently efficiently dispersing carbon black in the dispersion medium.

The backbone useful for the polymeric surfactant for high dielectric polymer composites according to the example embodiments may include, but is not limited to, one or more selected from among polyacryl, polyurethane, polystyrene, polysiloxane, polyether, polyisobutylene, polypropylene, and polyepoxy.

Examples of the head portion of the polymeric surfactant for high dielectric polymer composites according to the example embodiments may include, but are not limited to, compounds represented by Formulas 1 and 2 below:

Formula 1 wherein A is a backbone, which is connected to the backbone of the tail portion, and includes acryl, urethane, styrene, siloxane, ether, isobutylene, propylene or epoxy, R$_1$ is a hydrocarbon group having C$_{1~10}$ alkylamine, cycloalkylamine (cyclohexyl, pentylamine), arylamine (aniline, substituted aniline), amide or imine, with a —COOH, —SH, —PO$_3$H, —PO$_4$H, —SO$_3$H, or —SO$_4$H terminal, x ranges from 1 to 50, a ranges from 1 to 5, and b ranges from 1 to 10; and

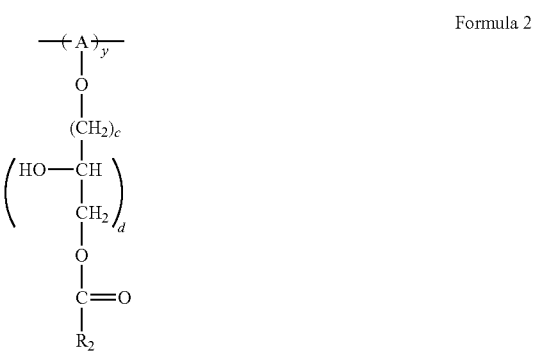

Formula 2 wherein A is a backbone, which is connected to the backbone or the tail portion, and includes acryl, urethane, styrene, siloxane, ether, isobutylene, propylene or epoxy, R$_2$ is a C$_{1~10}$ alkylamine group, a cycloalkylamine group (cyclohexyl, pentylamine), an arylamine group (aniline, substituted aniline), an amide group, or an imine group, y ranges from 1 to 50, c ranges from 1 to 5, and d ranges from 1 to 10.

The tail portion, useful in the example embodiments, may include one or more selected from among compounds represented by Formulas 3 and 4 below:

Formula 3

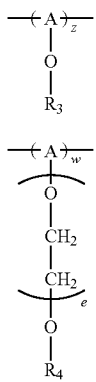

Formula 4 in Formulas 3 and 4, A is a backbone, including acryl, urethane, styrene, siloxane, ether, isobutylene, propylene or epoxy, $R_3$ is a $C_{1\sim10}$ alkyl group, an alkene group, or an alkyne group, $R_4$ is a $C_{1\sim10}$ alkyl group, an alkene group, an alkyne group, or a $C_{6\sim30}$ aryl group, z and w each range from 1 to 50, and a ranges from 1 to 20.

The polymeric surfactant according to the example embodiments may be represented by Formulas 5 to 9 below:

Formula 5

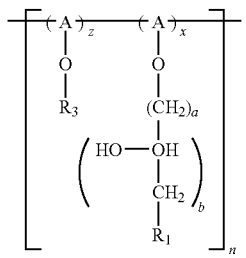

wherein A in a backbone, including acryl, urethane, styrene, siloxane, ether, isobutylene, propylene or epoxy, $R_1$ is a hydrocarbon group having $C_{1\sim10}$ alkylamine, cycloalkylamine (cyclohexyl, pentylamine), arylamine (aniline, substituted aniline, amide or imine, with a —COOH, —SH, —PO$_3$H, —PO$_4$H, —SO$_3$H, or —SO$_4$H terminal, $R_3$ is a $C_{1\sim30}$ alkyl group, an alkene group, or an alkyne group, x and z each range from 1 to 50, a ranges from 1 to 5, b ranges from 1 to 10, and n ranges from 1 to 50;

Formula 6

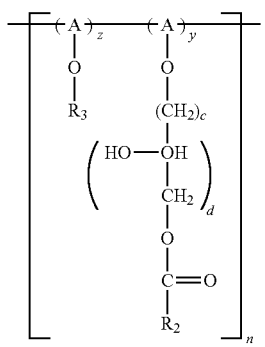

wherein A is a backbone, including acryl, urethane, styrene, siloxane, ether, isobutylene, propylene or epoxy, $R_2$ is a $C_{1\sim10}$ alkylamine group, a cycloalkylamine group (cyclohexyl, pentylamine, an arylamine group (aniline, substituted aniline), an amide group, or an imine group, $R_3$ is a $C_{1\sim30}$ alkyl group, an alkene group, or an alkyne group, y and z each range from 1 to 50, c ranges from 1 to 5, d ranges from 1 to 10, and n ranges from 1 to 50;

Formula 7

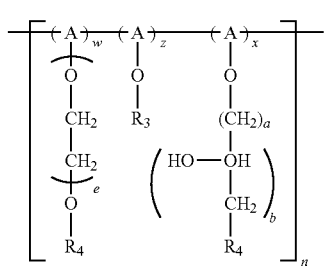

wherein A is a backbone, including acryl, urethane, styrene, siloxane, ether, isobutylene, propylene or epoxy, $R_1$ is a hydrocarbon group having $C_{1\sim10}$ alkylamine, cycloalkylamine (cyclohexyl, pentylamine), arylamine (aniline, substituted aniline), amide or imine, with a —COOH, —SH, —PO$_3$H, —PO$_4$H, —SO$_3$H, or —SO$_4$H terminal, $R_3$ is a $C_{1\sim30}$ alkyl group, an alkene group, or an alkyne group, $R_4$ is a $C_{1\sim10}$ alkyl group, an alkene group, an alkyne group, or a $C_{6\sim30}$ aryl group, x, z and w each range from 1 to 50, a ranges from 1 to 5, b ranges from 1 to 10, e ranges from 1 to 20, and n ranges from 1 to 50;

Formula 8

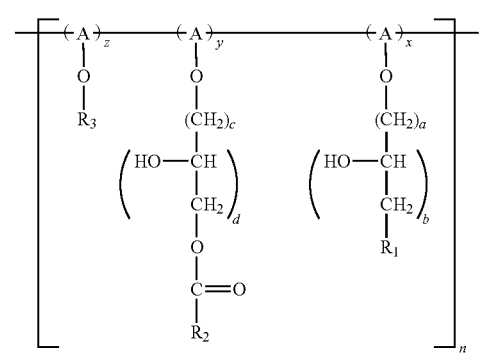

wherein A is a backbone, including acryl, urethane, styrene, siloxane, ether, isobutylene, propylene or epoxy, $R_1$ is a hydrocarbon group having $C_{1\sim10}$ alkylamine, cycloalkylamine (cyclohexyl, pentylamine), arylamine (aniline, substituted aniline), amide or imine, with a —COOH, —SH, —PO$_3$H, —PO$_4$H, —SO$_3$H, or —SO$_4$H terminal, $R_2$ is a $C_{1\sim10}$ alkylamine group, a cycloalkylamine group (cyclohexyl, pentylamine, an arylamine group (aniline, substituted aniline), an amide group, or an imine group, $R_3$ is a $C_{1\sim30}$ alkyl group, an alkene group, or an alkyne group, x, y and z each range from 1 to 50, a and c range from 1 to 5, b and d range from 1 to 10, and n ranges from 1 to 50; and Formula 9

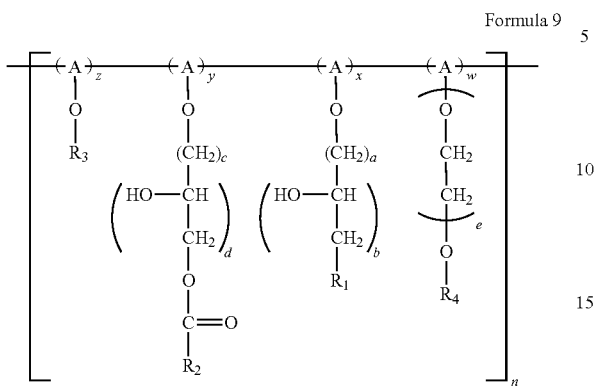

wherein A in a backbone, including acryl, urethane, styrene, siloxane, ether, isobutylene, propylene or epoxy, $R_1$ is a hydrocarbon group having $C_{1\sim10}$ alkylamine, cycloalkylamine (cyclohexyl, pentylamine), arylamine (aniline, substituted aniline), amide or imine, with a —COOH, —SH, —PO$_3$H, —PO$_4$H, —SO$_3$H, or —SO$_4$ terminal, $R_2$ is a $C_{1\sim10}$ alkylamine group, a cycloalkylamine group (cyclohexyl, pentylamine), an arylamine group (aniline, substituted aniline), an amide group, or an imine group, $R_3$ is a $C_{1\sim30}$ alkyl group, an alkene group, or an alkyne group, $R_4$ is a $C_{1\sim10}$ alkyl group, an alkene group, an alkyne group, or a $C_{6\sim30}$ aryl group, x, y, z and w each range from 1 to 50, a and c range from 1 to 5, b and d range from 1 to 10, e ranges from 1 to 20, and n ranges from 1 to 50.

Examples of the polymeric surfactant according to the example embodiments may include, but are not limited to, compounds represented by Formulas 10 to 15 below:

Formula 10

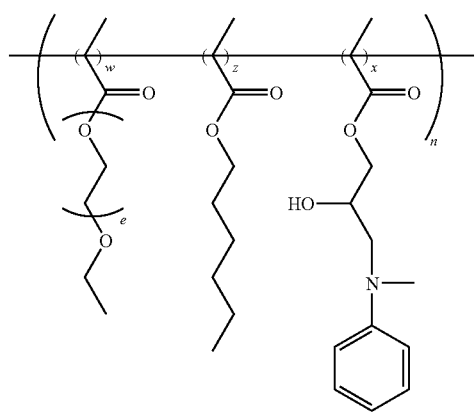

Formula 11

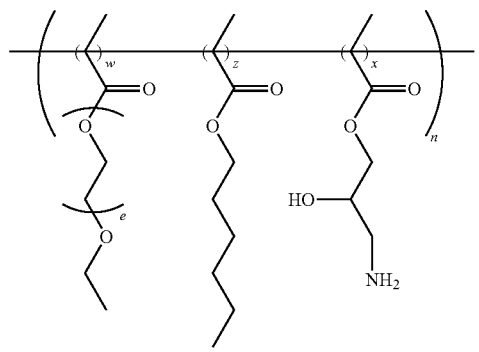

Formula 12

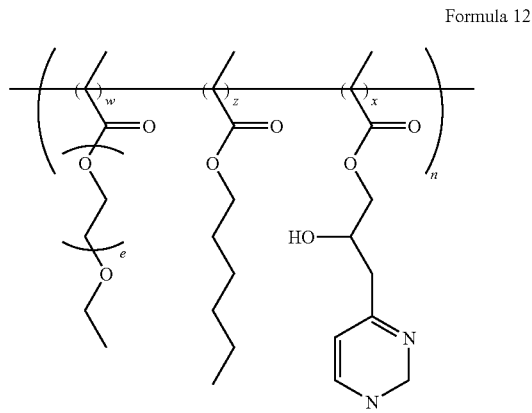

Formula 13

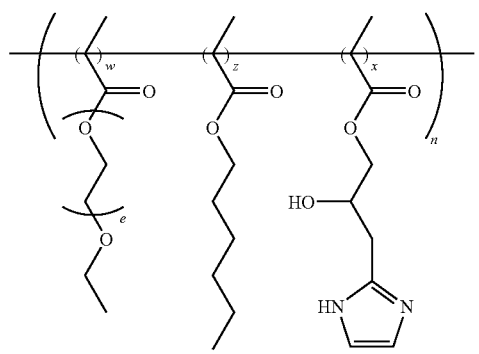

-continued

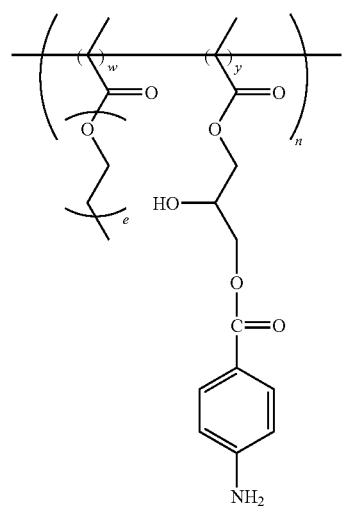

Formula 14

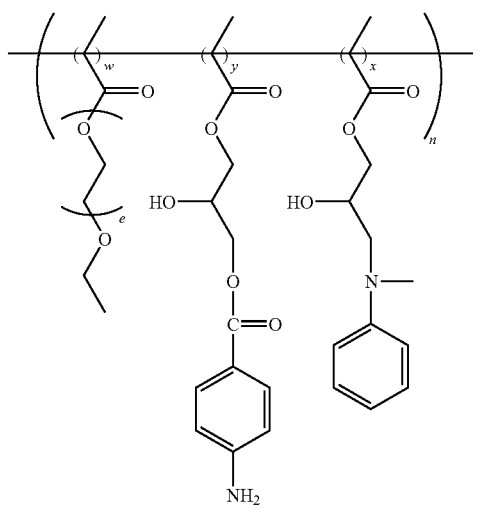

Formula 15 in Formulas 10 to 15, x, y, z and w each range from 1 to 50, e ranges from 1 to 20, and n ranges from 1 to 50.

The polymeric surfactant according to the example embodiments may have a number average molecular weight ranging from about 1,000 to about 30,000. When the number average molecular weight of the surfactant is less than 1,000, the surfactant according to the example embodiments, which is polymeric, becomes oligomeric. On the other hand, when the number average molecular weight of the surfactant exceeds 50,000, the surfactant according to the example embodiments belongs to the binder region.

In addition, the example embodiments provide a method of preparing the polymeric surfactant for high dielectric polymer composites, including reacting one or more compounds selected from among compounds represented by Formulas 3 and 4 below with a compound represented by Formula 16 below in the presence of a polymerization initiator, thus obtaining a copolymer, and then reacting the copolymer thus obtained with a monomer for forming one or more head portions in the presence of an acid catalyst, thus forming one or more head portions:

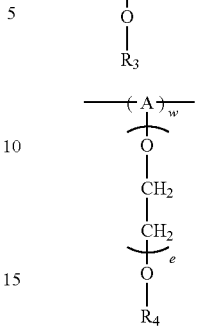

Formula 3

Formula 4 in Formulas 3 and 4, A is a backbone, including acryl, urethane, styrene, siloxane, ether, isobutylene, propylene or epoxy, $R_3$ is a $C_{1\sim30}$ alkyl group, an alkene group, and an alkyne group, $R_4$ is a $C_{1\sim10}$ alkyl group, an alkene group, an alkyne group, or a $C_{6\sim30}$ aryl group, z and w each range from 1 to 50, and e ranges from 1 to 20; and $$\underset{R_5}{\overset{A}{|}}$$

Formula 16 wherein A is a backbone, including acryl, urethane, styrene, siloxane, ether, isobutylene, propylene or epoxy, and $R_5$ is a $C_{1\sim10}$ chain or cyclic epoxy group.

In the method according to the example embodiments, the tail portion of the polymeric surfactant may be selected from among compounds represented by Formulas 1 and 4.

In the method of preparing the polymeric surfactant according to the example embodiments, the monomer for forming one or more head portions may include one or more selected from among compounds represented by Formulas 17 and 18 below, thiol compounds, phosphoric acid compounds, and sulfonic acid compounds:

 X—Y    Formula 17

 X—Y—COOH    Formula 18 in Formulas 17 and 18, X is an amine group, an aniline group, an amide group, or an imine group, and Y is a $C_{6\sim30}$ arylene group, a $C_{1\sim10}$ alkyl group, an alkene group, or an alkyne group.

Examples of the polymerization initiator include, but are not limited to, methyl trimethylsilyl dimethylketeneacetal, potassium persulfate, hydrogen peroxide, cumyl hydroperoxide, di-tert butyl peroxide, dilauryl peroxide, acetyl peroxide, benzoyl peroxide, and ATBN.

Below, the method of synthesizing the polymeric surfactant according to the example embodiments is described in detail. For example, with reference to Reaction 1 below, as the tail portion, polyethylene glycol methacrylate and hexyl methacrylate are used, and glycidyl methacrylate is used as the monomer for reaction with the head portion, and also, GTP (Group Transfer Polymerization) is conducted, thus synthesizing the tail portion of the polymeric surfactant. As such, in order to change the type of side chain thereof, a starting material containing a different type of side chain may be used.

The tail portion thus synthesized is reacted with the monomer for forming the head portion to thus obtain the polymeric surfactant in which the head portions and the tail portions are connected to the backbones. The reaction is conducted through the additional reaction of an epoxy group and an acid in the presence of the acid or ammonium salt catalyst. In Reaction 1, the monomer for forming the head portion is exemplified by N-methylaniline. For the above reaction, the acid or ammonium salt catalyst is used, and the reaction is performed at a temperature ranging from room temperature to 130° C. for a period of time ranging from 30 min to 15 hours under atmospheric pressure, followed by conducting heating, refluxing and vacuum evaporation to remove the solvent, thereby obtaining a desired polymeric surfactant.

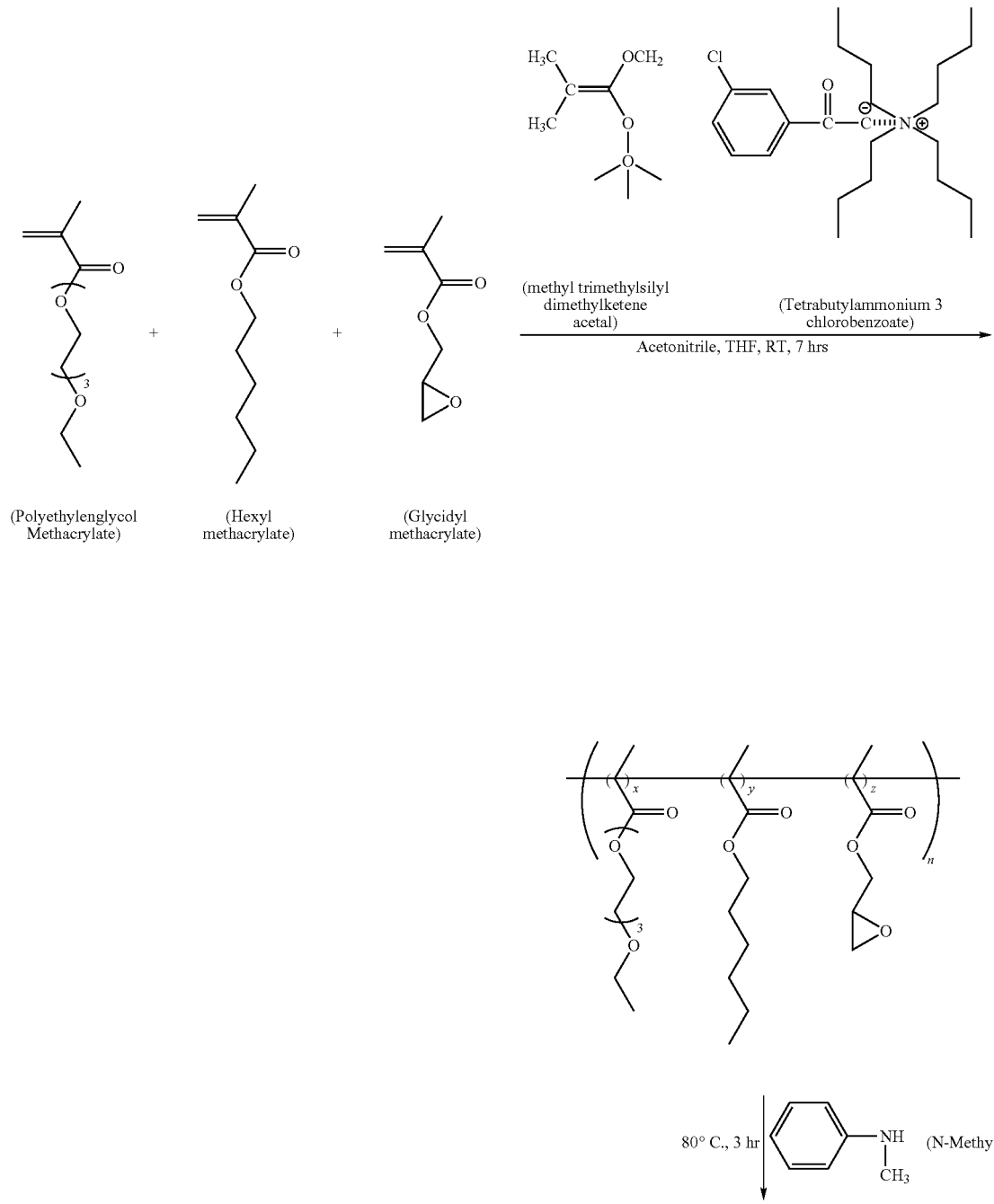

-continued

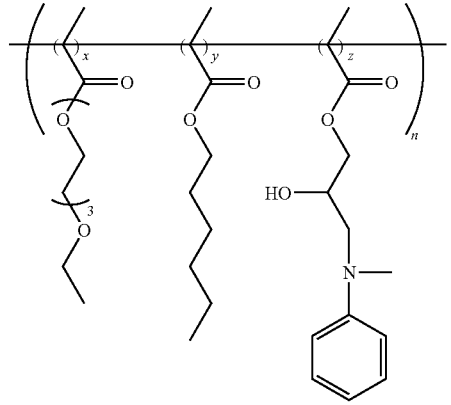

In addition, the example embodiments provide a high dielectric polymer composite including the polymeric surfactant according to the example embodiments, the conductive material, and the polymer resin.

The conductive material may include one or more selected from among carbon black, carbon nanotubes, carbon nanowires, carbon fibers, and graphite.

The polymer resin used for the polymer composite according to the example embodiments may include, but is not limited to, one or more selected from among epoxy, polyimide, silicon polyimide, silicone, polyurethane, and benzocyclobutene.

The high dielectric polymer composite may include 10~80 parts by weight of the polymeric surfactant based on 100 parts by weight of the conductive material, and 50~98 vol % of the polymer resin based on the total volume of the high dielectric polymer composite.

The high dielectric polymer composite according to the example embodiments may be added with binder or other organic additives.

In the high dielectric polymer composite according to the example embodiments, when the conductive material, the polymeric surfactant and the polymer resin are mixed together, a stirring or mixing apparatus, including a sonicator, a homogenizer, a spiral mixer, a planetary mixer, a disperser, or a hybrid mixer, may be used.

The high dielectric polymer composite according to the examples embodiments is mixed with a solvent, after which the mixture may be applied on a substrate through a simple coating process, including spin coating, electrophoresis, casting, ink-jet printing, spraying, or off-set printing.

In the case of a conventional polymer composite that does not use the polymeric surfactant, when the amount of conductive material to be added reaches a vol % of a predetermined level, a dielectric constant of 10,000 or more may be attained, thus achieving a high dielectric constant. However, when the amount of conductive material exceeds a vol % of a predetermined level, the dielectric constant is drastically decreased. This is because the increase in the vol % of the conductive material, for example, carbon black, in the polymer composite incurs electrical conduction or percolation between the particles of the conductive material. Ultimately, the conventional polymer composite is disadvantageous in that it is difficult to control the dielectric constant of the composite, attributable to the narrow percolation threshold window thereof. However, according to the example embodiments, even when the vol % of the conductive material is increased, the polymeric surfactant plays a role as the passivation layer for preventing the generation of electrical conduction or percolation between the particles of the conductive material, so that a high dielectric constant may be ensured in a predetermined range, and furthermore, the percolation threshold window may be widened, thus facilitating the control of the dielectric constant of the composite.

In addition, the high dielectric polymer composite according to the example embodiments may be applied to capacitors, and may also be used as material for electron guns or electrodes of field emission displays (FEDs), material for transparent electrodes of FEDs or liquid crystal displays, and light-emitting material, buffering material, electron transporting material, and hole transporting material for organic electroluminescent devices. For example, in the capacitor including the high dielectric polymer composite according to the example embodiments, the high dielectric polymer composite may be used as a dielectric between opposite electrodes. In addition to a general capacitor structure, the high dielectric polymer composite according to the example embodiments may be applied to a laminated capacitor structure.

A better understanding of the present invention may be obtained through the following examples which are set forth to illustrate, but are not to be construed as the limit of the present invention.

EXAMPLE

Preparative Example 1 i) Synthesis of Tail Portion

The composition ratio of polyethylene glycol methacrylate, hexyl methacrylate and glycidyl methacrylate was set to 1:1:1. For the synthesis of a tail portion as a block copolymer having an expected molecular weight of 2,000, an initiator, for example, methyl trimethylsilyl dimethylketeneacetal (3.48 g, 20 mmol), and a catalyst, for example, tetrabutylammonium-3-chlorobenzoate (0.07 g, 0.17 mmol), were dissolved in acetonitrile (1 ml) and THF (10 ml), placed in a round-bottom flask, and then stirred for 30 min using magnetic stirring bars. This solution was slowly added with the monomers, for example, polyethyleneglycol methacrylate (6.603 g, 7.5 mmol), hexyl methacrylate (4.569 g, 7.5 mmol) and glycidyl methacrylate (3.816 g, 7.5 mmol), and thus allowed to react for 7 hours, after which the disappearance of the monomers was confirmed through gas chromatography.

ii) Introduction of Head Portion

Figure 2:
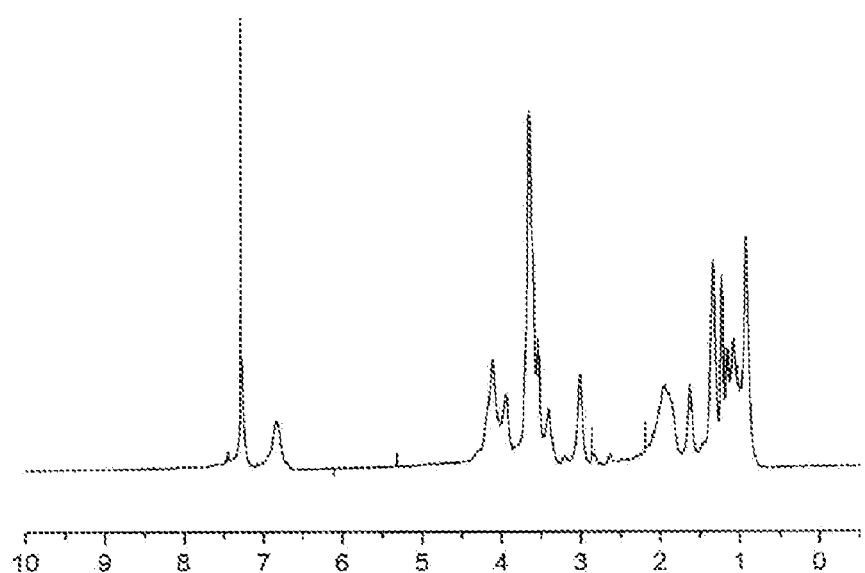

A catalyst, for example, tetraethyl ammonium, chloride (0.8 g, 4.82 mmol), was dissolved in acetonitrile (0.5 ml), and was then added thereto, after which N-methylaniline was added in an equivalent amount. Then, the reaction solution was allowed to react at 80° C. for 3 hours under atmospheric pressure, after which the reaction product was subjected to vacuum evaporation to remove the solvent, thereby obtaining a polymeric surfactant. The NMR graph of the polymeric surfactant is shown in FIG. 2.

Example 1

Figure 3:
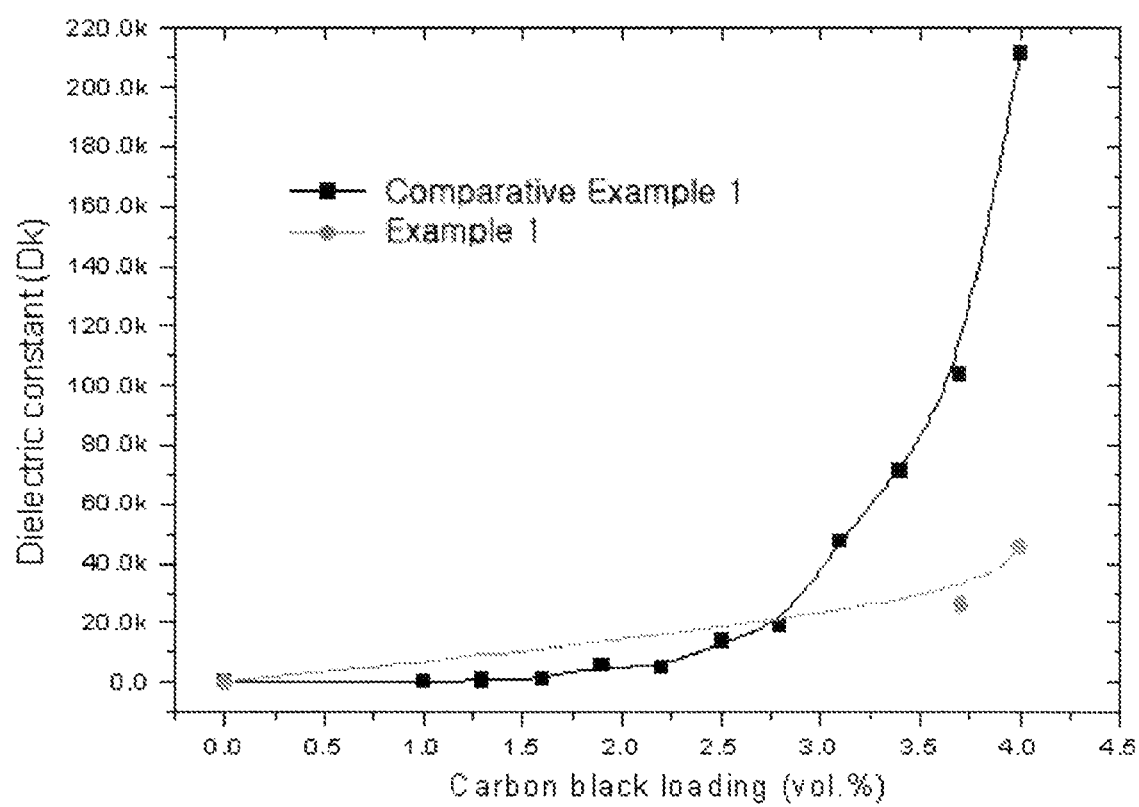
Figure 4:
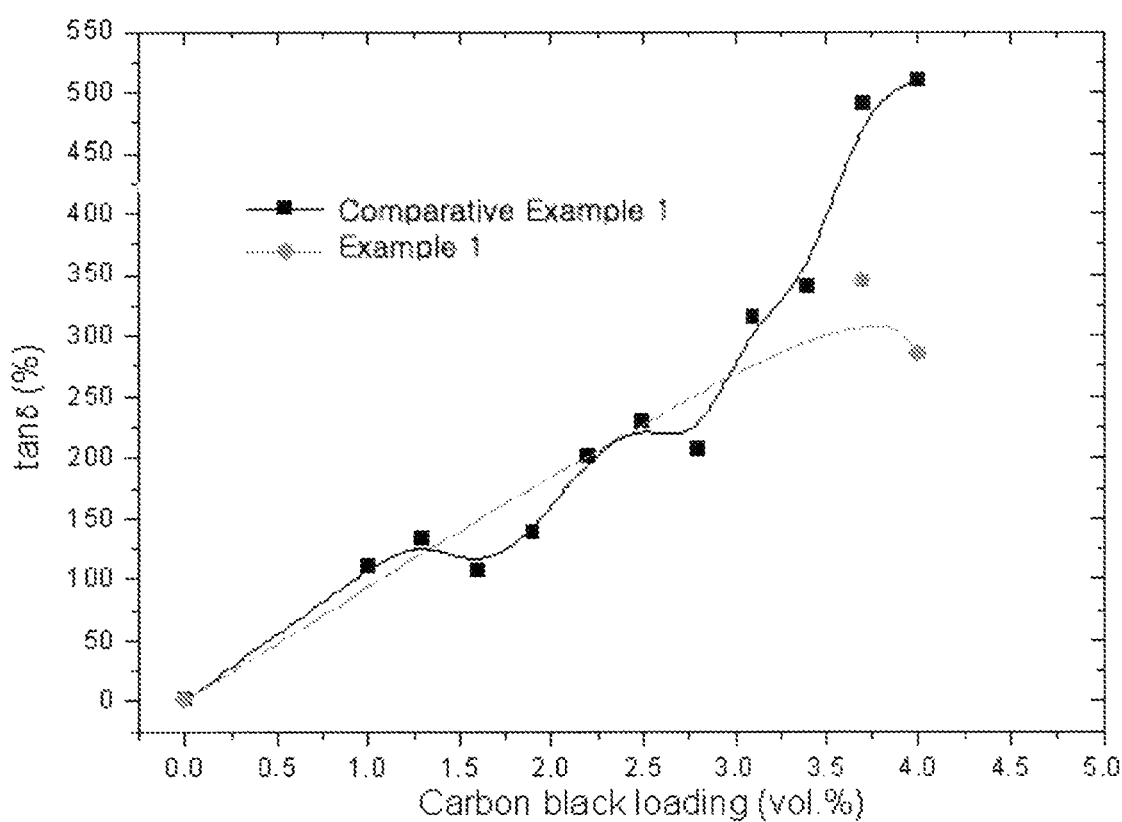

0.134 g of the polymeric surfactant synthesized in the above preparative example was added to a composite including 1.557 g of 3,4epoxycyclohexylmethyl-3,4-epoxycyclohexanecarboxylate (Aldrich), 0.191 g of carbon black (Ketjen black 300, Mitsubishi), 1.501 g of hexahydro-4-methyliphthalic anhydride (Aldrich), and 0.005 g of 1-methylimidazole (Aldrich), thus obtaining the polymer composite according to the example embodiments. Thereafter, depending on the vol % of carbon black, the dielectric constant and dielectric loss of the composite were measured. The results are shown in FIGS. 3 and 4.

Comparative Example 1

This comparative example wax conducted in the same manner as in Example 1, with the exception that the polymeric surfactant was not added, after which the dielectric constant and dielectric loss of the obtained composite were measured depending on the vol % of carbon black of the composite. The results are shown in FIGS. 3 and 4.

The dielectric constant and dielectric loss in Example 1 and Comparative Example 1 were measured for an average measurement time of 4 sec/point at a frequency ranging from 10 K to 10 M (Hz) using an impedance analyzer, for example, HP 419A. Under conditions in which the voltage that is applied was set to the range from −3.0 to 3.0 and the applied voltage interval was set to 0.10, capacitance was determined and then substituted into the following equation, and thus the dielectric constant was calculated. In particular, when the vol % of carbon black in Example 1 and Comparative Example 1 was 3.7 and 4.0 (carbon black: 0.191 g, 0.207 g), the dielectric constant, dielectric loss, and thickness were measured. The results are shown in Table 1 below.

$$\varepsilon_0 = 8.854 \times 10^{-12} [F/m]$$

$$r = 150 \times 10^{-6} [m]$$

$$\varepsilon_r = \frac{Cd}{\varepsilon_0 A} = \frac{Cd}{\varepsilon_0 \pi r^2}$$

Table 1 below shows the dielectric constant, the dielectric loss, and thickness in Example 1 and Comparative Example 1.

TABLE 1

|  | Carbon Black (vol %) | Dielectric Constant | Dielectric Loss (%) | Thickness (μm) |
|---|---|---|---|---|
| Ex. 1 | 3.7 | 25836 | 344.52 | 30 |
|  | 4.0 | 45100 | 285 | 28 |
| C. Ex. 1 | 3.7 | 103758 | 491.35 | 32 |
|  | 4.0 | 211411 | 510 | 33 |

As is apparent from Table 1 and FIGS. 3 and 4, in Comparative Example 1, in which the polymeric is surfactant was not added, the dielectric constant was drastically increased. However, in Example 1, in which the polymeric surfactant was added, the dielectric constant was gradually increased and thus a high dielectric constant was maintained for a long time. In the case where the polymeric surfactant is used, the dielectric constant is gradually increased near the percolation threshold, so that the percolation threshold window is stably widened, consequently facilitating the control of the dielectric constant and remarkably decreasing the dielectric loss. Specifically, the polymeric surfactant according to the example embodiments can be confirmed to play a role as the passivation layer for preventing the generation of electrical conduction or percolation between the particles of the conductive material. Thus, when the polymeric surfactant according to the example embodiments is used, a high dielectric constant may be maintained for a longer time than when using general insulating-coating techniques.

As described hereinbefore, the example embodiments provide a polymeric surfactant for high dielectric polymer composites, a method of preparing the same, and a high dielectric polymer composite including the same. According to the example embodiments, because the polymeric surfactant for high dielectric polymer composites may form a passivation layer that surrounds a conductive material, for example, carbon black or carbon nanotabes, in a polymer resin, it may prevent the generation of electrical conduction on percolation due to contact between the particles of the conductive material, thus ensuring and controlling a high dielectric constant. Hence, the polymeric surfactant for high dielectric polymer composites, according to the example embodiments, may be efficiently used for capacitors. Further, the polymeric surfactant for high dielectric polymer composites, according to the example embodiments, enables the manufacture of the high dielectric polymer composite at low temperatures, thus contributing to a decrease in the size and weight of mobile electronic instruments.

Although preferred example embodiments have been disclosed for illustrative purposes, those skilled in the art will appreciate that various modifications, additions and substitutions are possible, without departing from the scope and spirit of the accompanying claims.

What is claimed is:

1. A polymer composite, comprising:
    a polymeric surfactant including a tail portion composed of a backbone and one or more first side chains connected to the backbone, wherein the first side chains are hydrophilic or hydrophobic, a head portion connected to the backbone containing a side chain having an arylamine functional group, wherein the polymeric surfactant is represented by Formula 10 below:

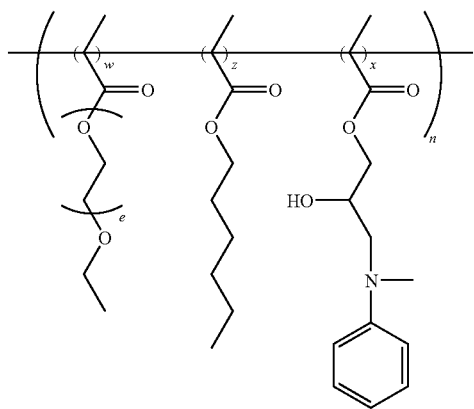

Formula 10 wherein in Formula 10, x, z and w each range from 1 to 50, e ranges from 1 to 20, and n ranges from 1 to 50;

wherein the polymeric surfactant has a number average molecular weight of from 1,000 to 30,000;

a conductive material selected from a group consisting of carbon black, carbon nanotubes, carbon nanowires, carbon fibers, and graphite; and a polymer resin;

wherein the head portion is bound to the conductive material through chemical reaction and the tail portion is oriented toward the polymer resin.

2. The polymer composite as set forth in claim 1, wherein the polymer resin comprises one or more selected from a group consisting of epoxy, polyimide, silicon polyimide, silicone, polyurethane, and benzocyclobutene.

3. The polymer composite as set forth in claim 1, wherein the polymer composite comprises 10~80 parts by weight of the polymeric surfactant based on 100 parts by weight of the conductive material; and 50~98 vol % of the polymer resin based on a total volume of the polymer composite.

4. A capacitor, comprising the polymer composite of claim 1.

* * * * *